Oct. 26, 1965    H. D. SULLIVAN ETAL    3,214,206
TWINE RETAINER SPRING
Filed May 10, 1963    2 Sheets-Sheet 1

INVENTORS
Herbert D. Sullivan
Bill R. Littlejohn
Atty.

Oct. 26, 1965  H. D. SULLIVAN ETAL  3,214,206
TWINE RETAINER SPRING
Filed May 10, 1963  2 Sheets-Sheet 2
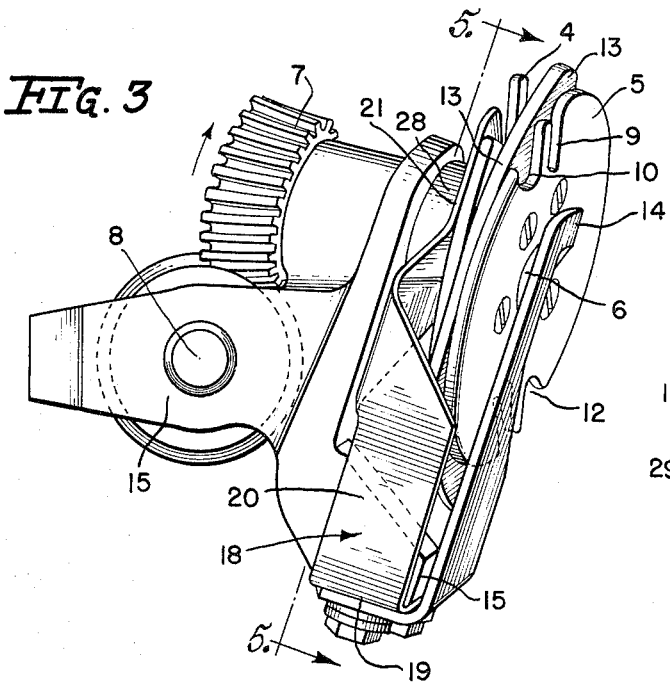
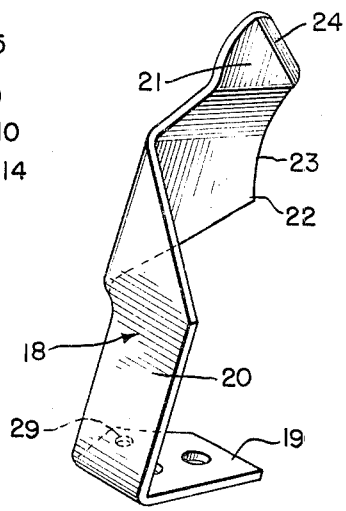
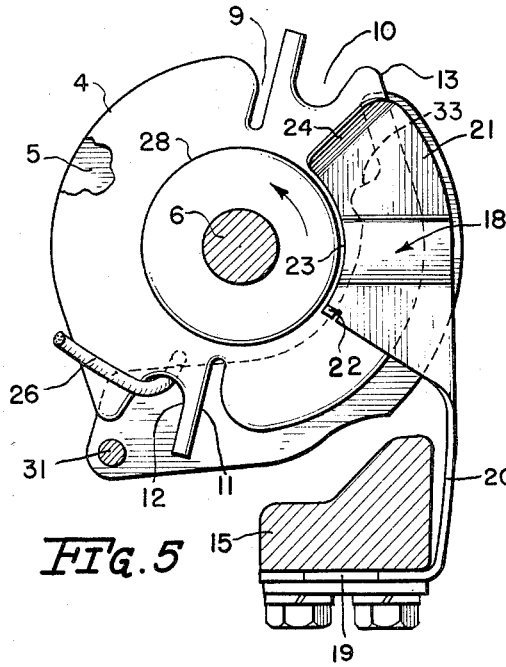
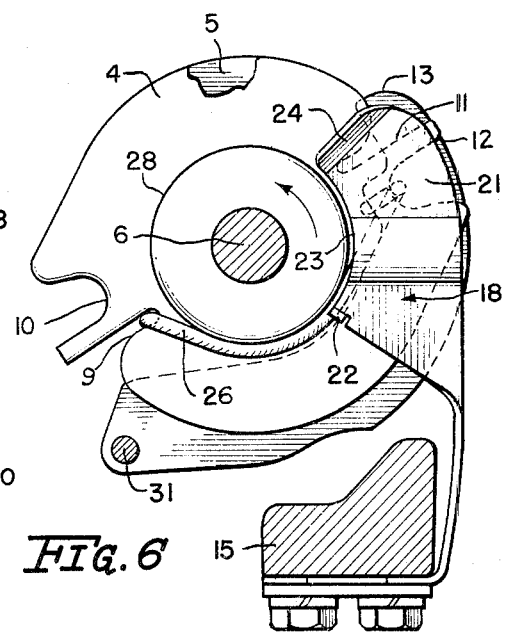
INVENTORS
Herbert D. Sullivan
Bill R. Littlejohn
Atty.

United States Patent Office 3,214,206
Patented Oct. 26, 1965

3,214,206
TWINE RETAINER SPRING
Herbert D. Sullivan and Bill R. Littlejohn, Memphis, Tenn., assignors to International Harvester Company, Chicago, Ill., a corporation of New Jersey
Filed May 10, 1963, Ser. No. 279,504
3 Claims. (Cl. 289—14)

This invention is a new and useful improvement in the twine-tying mechanism of a hay baler. More particularly, the improvement relates to the cord holder of a twine knotter assembly and the addition thereto of a twine retainer spring to supplement the normal cord-gripping action of the cord holder assembly.

As an improvement over the prior art, the invention has the following objects:

First, to supplement the normal cord-gripping action of a cord holder to compensate for a loss of gripping power caused by wear of the cord holder parts, by variations in materials or size of the twine, or by larger forces occurring during the compacting of dense bales.

Second, to promote trouble-free operation of a twine-tying mechanism by providing a supplemental twine retainer to grip the twine and prevent it from becoming prematurely detached from the cord holder during the tying cycle.

In the drawings:

FIGURE 3 is a perspective view of the twine knotter assembly taken from another position;

FIGURE 4 is a perspective view of the twine retainer spring per se;

FIGURE 5 is a sectional view taken at the line 5—5 in FIGURE 3, showing the cord holder disks and the twine retainer spring after the needle arm has delivered twine to the first cord-holding stage;

FIGURE 6 is a view similar to FIGURE 5 showing the section of twine extending from the first cord-holding stage to the second cord-holding stage and exposed to the novel twine retainer spring.

The basic twine-tying mechanism incorporating the novel twine retainer spring is well-known in the prior art. It comprises (1) a rotary cord holder assembly for gripping the twine during the bale-forming and knot-tying operations, (2) a needle arm for delivering twine to the cord holder, (3) a rotary knotter assembly for tying a knot in the twine encircling the bale, (4) a knife for cutting the twine, and (5) a drive mechanism for supplying power to the various components of the twine-tying mechanism.

Figure 1:
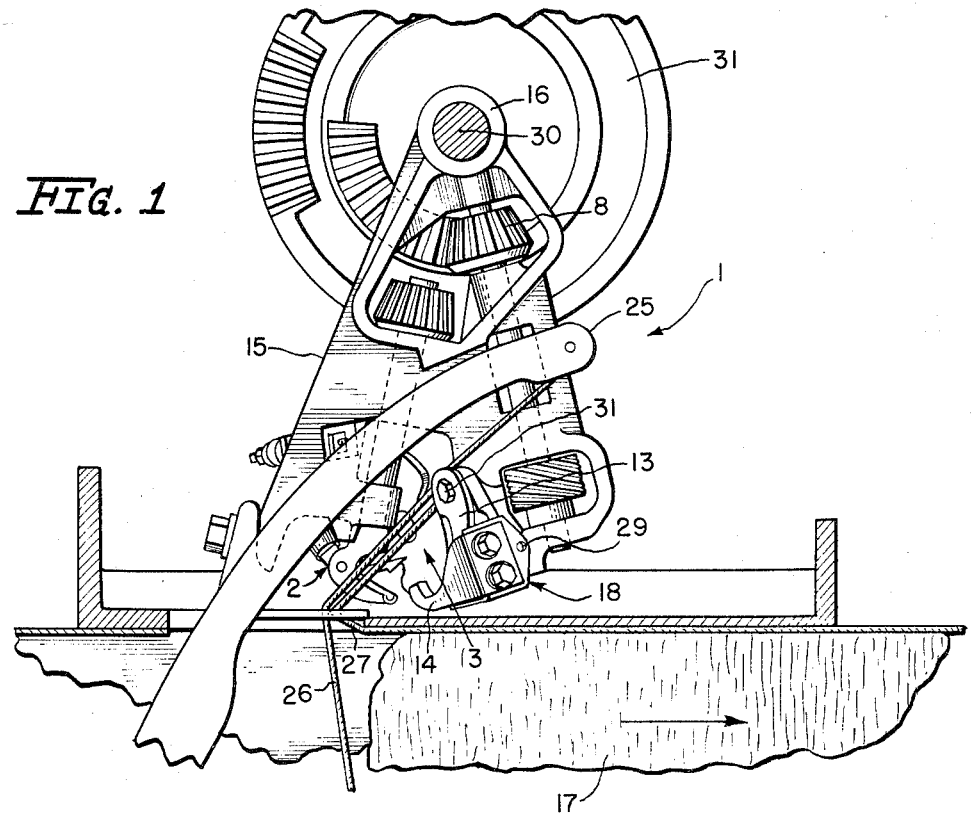
FIGURE 1 is an elevation showing the location of the twine knotter assembly relative to the other parts of the twine-tying mechanism.

With reference to FIGURE 1 of the drawings the numeral 1 identifies a twine-tying mechanism of the general type with which the new and novel twine retainer spring is used. The needle arm for supplying twine to the cord holder is indicated at 25. The cord holder assembly 3, the twine knotter assembly 2, and the twine knife 14 are assembled on a frame 15, which is adapted by a hub 16 for mounting on a drive shaft 30. Since the cord holder assembly 3 provides the setting for novel twine end retainer spring 18, the cord holder assembly is described below in greater detail.

Figure 2:
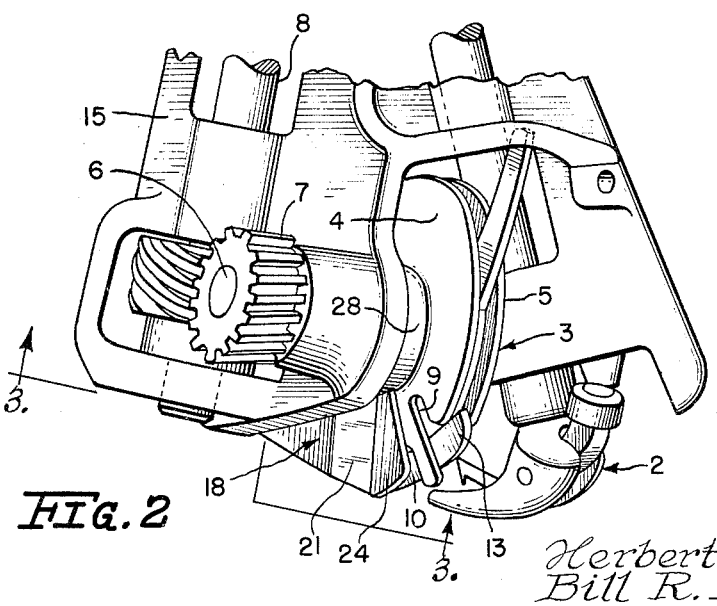
FIGURE 2 is a perspective view showing the reverse side of the twine knotter assembly and the location of the novel twine retainer spring relative to the other elements of the knotter.

The cord holder assembly is a mechanical device for gripping the twine while a bale of hay 17 is being formed and while a knot is being tied in the twine encircling the bale 17. As shown in FIGURES 2 and 3 the cord holder assembly 3 incorporating the new twine end retainer spring 18 comprises a pair of slotted disks 4 and 5 mounted parallel to each other on a spindle 6. Located between the disks 4 and 5 and offset from the axis thereof is a pivoted keeper blade 13, which cooperates with the slotted disks to grip the twine. The twine knife 14 and the twine retainer spring 18 are mounted at one end of frame 15 adjacent to disks 4 and 5. The knife 14 extends along the front of disk 5 adjacent knotter assembly 2. Twine retainer spring 18 extends along the surface of disk 4. Power to rotate the cord holder assembly is supplied by shaft 30 and gearing 31 to the gearing 8, which in turn drives the gear 7 and spindle 6.

As shown in the drawings, both disks 4 and 5 are constructed alike. Two pairs of radial slots are cut in the periphery of each disk at diametrically opposed points thereof known as cord-holding stages. Each pair of slots consists of one narrow slot 9 or 11 for holding the free end of twine during the bale-forming period and one wide slot 10 or 12 for holding the spool end of the twine during the knot-tying operation. The corresponding slots on the two disks are in alignment. The keeper blade 13 is of the tapered form shown in FIGURE 5 and is mounted at its larger end on a pivot 31 between the cord holder disks 4 and 5 at a point offset from the axis of rotation of the disks.

The grip or hold of the cord holder assembly on the twine must be adequate to secure the twine, first, while the bale of hay 17 is being compacted and, second, while a knot is being tied in the twine encricling the bale of hay. If the twine should come free during either of these operations, the bale of hay will be ejected from the baler unbound and be scattered about the field. Various conditions can enable the twine to come free. For example, the abrasive action of the twine on the cord holder disk and on the keeper blade causes both parts to wear, so they are not able to exert a firm grip on the twine. Also variations in the diameter and in the co-efficient of friction of materials used in the twine limit the ability of the cord holder to grip the twine. Similarly the compacting of denser bales of hay requires larger forces, which tend to pull the twine loose from the cord holder during the bale-forming operation. Also, resilient materials, such as straw, tend to expand during the tying cycle, the forces of expansion tending, in turn, to cause premature detachment of the loose end of the twine from the cord holder.

To insure a firm grip on the baling twine, a novel metal retainer spring 18 is used to clamp a section of the twine against the side of one of the cord holder disks. The particular section of twine acted on by the retainer spring 18 extends along the surface of cord holder disk 4 from one pair of aligned slots 10 to a second pair of aligned slots 11. The twine associated with the first pair of slots 10 is delivered on the inward stroke of the needle arm. It completes the loop of twine around the bale and, hence, is the tail end of the strand twine. The twine associated with the second pair of slots 11 is delivered on the outward stroke of the needle arm. It starts the loop of twine around the next bale and, hence, is the leading end of a strand of twine. Since binding is a continuous process, the tail end of the twine around one bale is temporarily connected directly to the leading end of the twine around the following bale. It is this section of twine connecting a tail end of twine to a leading end of twine that the retainer spring acts upon.

The twine end retainer spring, as shown in FIGURES 2, 3, 4, 5 and 6, comprises a metal stamping 18 with a base 19 for mounting the retainer spring on frame 15. Hole 29 (FIGURE 4) in base 19 may be used to adjust the position of the spring retainer 18 on frame 15 by inserting a rod in hole 29 and manipulating it to position the spring retainer as desired. A leg 20 extends outward from base 19 to retaining surface section 21. Projecting from surface section 21 at any suitable point is a tab 22, which fits between the hub 28 of disk 5 and the counterbore of frame 15 to locate or position retainer spring 18 relative to the other parts. Edge 23 of retainer spring 18 is arcuate in order to provide a close fit about the hub of disks 5. A lip 24 is located at the end of retainer surface 21. Retainer surface 21 lies flat against the surface of disk 4 with a spring-like action, that grips the twine when it is moved between the surface 21 and the disk 4.

As twine-tying mechanisms are standard equipment for agricultural work and since the operation thereof is well-known to those skilled in the art, a detailed explanation of the operation of the twine-typing mechanism is believed to be unnecessary for the purposes of this disclosure. For a detailed explanation reference is made to the description given in U.S. Patent No. 3,101,963. A brief description suitable for present purposes follows:

The function of the twine-tying mechanism of the baler is to form a loop of twine around each bale as it is formed and to tie a knot in the ends of the loop of twine when the loop is finished. The operation of the twine-tying mechanism is such that for each bailing cycle the needle arm executes one forward and one reverse stroke, during both of which twine is delivered to the cord holder mechanism.

The forward delivery stroke is represented by FIGURE 5. When needle arm 25 moves forward, it places the free end of twine 26 in the slots 12 of disks 4 and 5. As needle arm 25 passes through the inner dead center of its forward stroke and starts on its reverse stroke, the cord holder disks are rotated by an intermittent drive 31 associated with the gear drive mechanism 8. With the rotation of the holder disks, the twine 26 in slot 12 is moved towards the keeper blade 13, and the main strand of twine 26 is played out on the surface of disk 4.

Because of the eccentric location of the keeper blade at the periphery of the disks, the twine at slots 12 moves under the keeper blade 13 and is kinked into a U-shape. That is, the twine extends down through the space between the side of holder disk 5 and the keeper blade 13, across the bottom edge of keeper blade 13, and up through the space between the side of holder disk 4 and the keeper blade 13. Since the clearance between the holder disk 13 and the keeper blades 4 and 5 is ordinarily less than the thickness of the twine, the cord holder exerts a grip on the twine.

By the time that the end of needle arm 25 passes over holder disks 4 and 5 on the return stroke, disks 4 and 5 have rotated counterclockwise, to align slots 9 with the path of needle arm 25. Needle arm 25 is therefore able to place the main strand of twine in slots 9, as shown in FIGURE 6. At this point in the cycle, the bale of hay is formed, the novel retainer spring 18 providing a supplemental cord holding action in the position shown in FIGURE 6 during the formation of the bale.

When the bale of hay is completed, disks 4 and 5 rotate to align slots 10 with the path of needle arm 25. Needle arm 25 then begins a new cycle and, on the inward stroke thereof, places twine in slot 10 in disks 4 and 5, similar to the action represented by FIGURE 5, to complete the loop of twine around the bale. The knotter then closes the loop by tying a knot at the closure point of the loop of twine. During the formation of the knot, the spring surface 21 continues to apply a gripping action on the tail end of twine 26 even after the disks 4 and 5 have rotated counterclockwise beyond the release point 33 (FIG. 5) of keeper blade 13. This continued gripping action prevents premature detachment of the twine end from the cord holder during the formation of the knot. With further rotation of the disks 4 and 5, the knife 14 cuts the twine extending beyond the knot and frees the bale from the twine running back to the spool. In proper order the action associated with FIGURES 5 and 6 and described above is repeated.

An additional cord-gripping action, provided by the novel retainer spring 18, is applied to the tail end of twine 26 extending from slot 12 to slot 9 in FIGURE 6. When the cord holder disks are rotated from the position shown in FIGURE 5 to the position shown in FIGURE 6, twine 26 trails out from slot 12 along the surface of holder disk 4. As the slot 12 passes under the retaining surface 21 of spring retainer 18, the twine 26 is moved under the surface 21 and gripped between disk 4 and surface 21, by virtue of the spring biasing action of retainer 18.

According to the foregoing description a new and improved twine-tying mechanism for a baler has been provided. Since various modifications in the details of construction will be apparent to persons skilled in the art to which the invention pertains, it is not intended to limit the invention to the exact form shown and described, but to embrace all such modifications as fall within the spirit and scope of the attached claims.

We claim:

1. A cord holder for a twine knotter assembly, comprising: a support member, a pair of rotatable cord holder disks mounted on said support member, a keeper blade pivotally mounted on said support and cooperating with both of said disks for gripping a strand of twine, a twine retainer spring for gripping said twine attached to said support member and having a portion in direct twine strand gripping relation with the side surface of one said disks.

2. A cord holder for a twine knotter assembly, comprising: a support member, a pair of rotatable cord holder disks operably mounted on said support member, a keeper blade pivotally mounted on said support and extending between said disks parallel to and spaced from the sides thereof, said disks and said keeper blade being adapted to grip a strand of twine, a twine retainer spring for gripping said strand of twine attached to said support member and cooperating directly with the side surface of one of said disks in gripping said strand of twine, said twine retainer spring comprising a flat clamping member extending parallel to said side surface and yieldable in a direction substantially normal thereto.

3. A cord holder for a twine knotter assembly for tying a strand of twine, comprising: a support member; a pair of rotary cord holder disks rotatably mounted on said support member, at least one of said disks having formed in the periphery thereof at one point a pair of depressions including one depression for receiving the leading end of a strand of twine and one depression for receiving the tail end of a strand of twine, said one disk having formed in the periphery thereof at a second point a second pair of depressions including one depression for receiving the leading end of a strand of twine and one depression for receiving the tail end of a strand of twine, the leading end depression of each pair of depressions preceding the tail end depression thereof relative to the direction of rotation of said disk; a keeper blade pivotally attached to said support member and extending along one side of said one disk and spaced therefrom; and a twine retainer spring for gripping a strand of twine extending from the tail end depression of one of said pairs of depressions to the leading end depression of the other of said pairs of depressions, said spring being mounted on said support member and having a face portion in twine gripping relation with the side of said one disk opposite the keeper blade side thereof.

References Cited by the Examiner
UNITED STATES PATENTS

| | | | |
|---|---|---|---|
| 2,594,140 | 4/52 | England | 289—14 |
| 2,815,233 | 12/57 | Collins | 289—13 |
| 2,815,234 | 12/57 | Collins | 289—14 |
| 2,945,716 | 7/60 | Collins | 289—14 |

DONALD W. PARKER, *Primary Examiner.*